W. WRIGHT.
COMBINED TYPE WRITING AND COMPUTING MACHINE.
APPLICATION FILED AUG. 1, 1910.
1,244,398.
Patented Oct. 23, 1917.
3 SHEETS—SHEET 3.
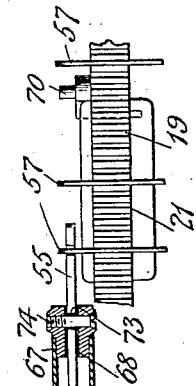
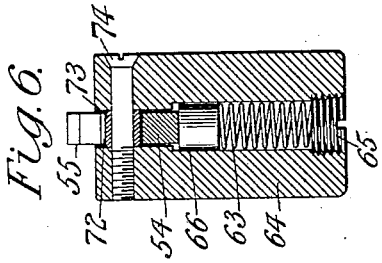
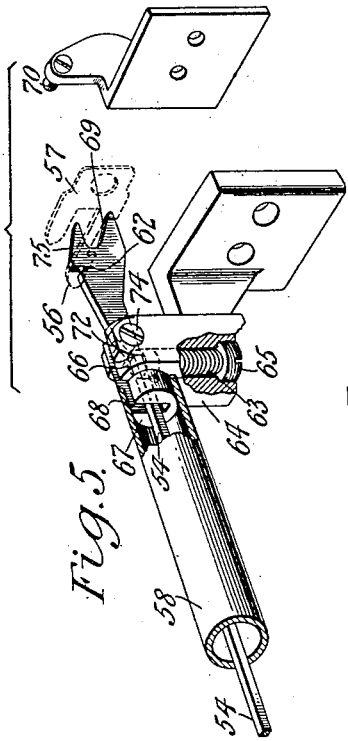
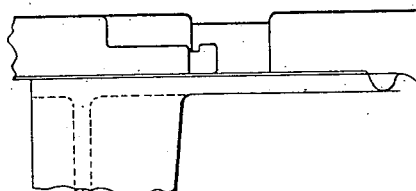
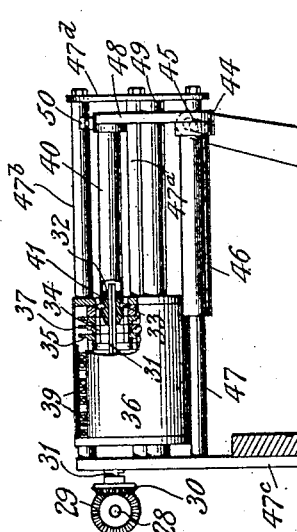
Witnesses:
John A Rennie
J. E. Alexander
Inventor:
Walter Wright
By
B.C.Stickney
his Attorney.

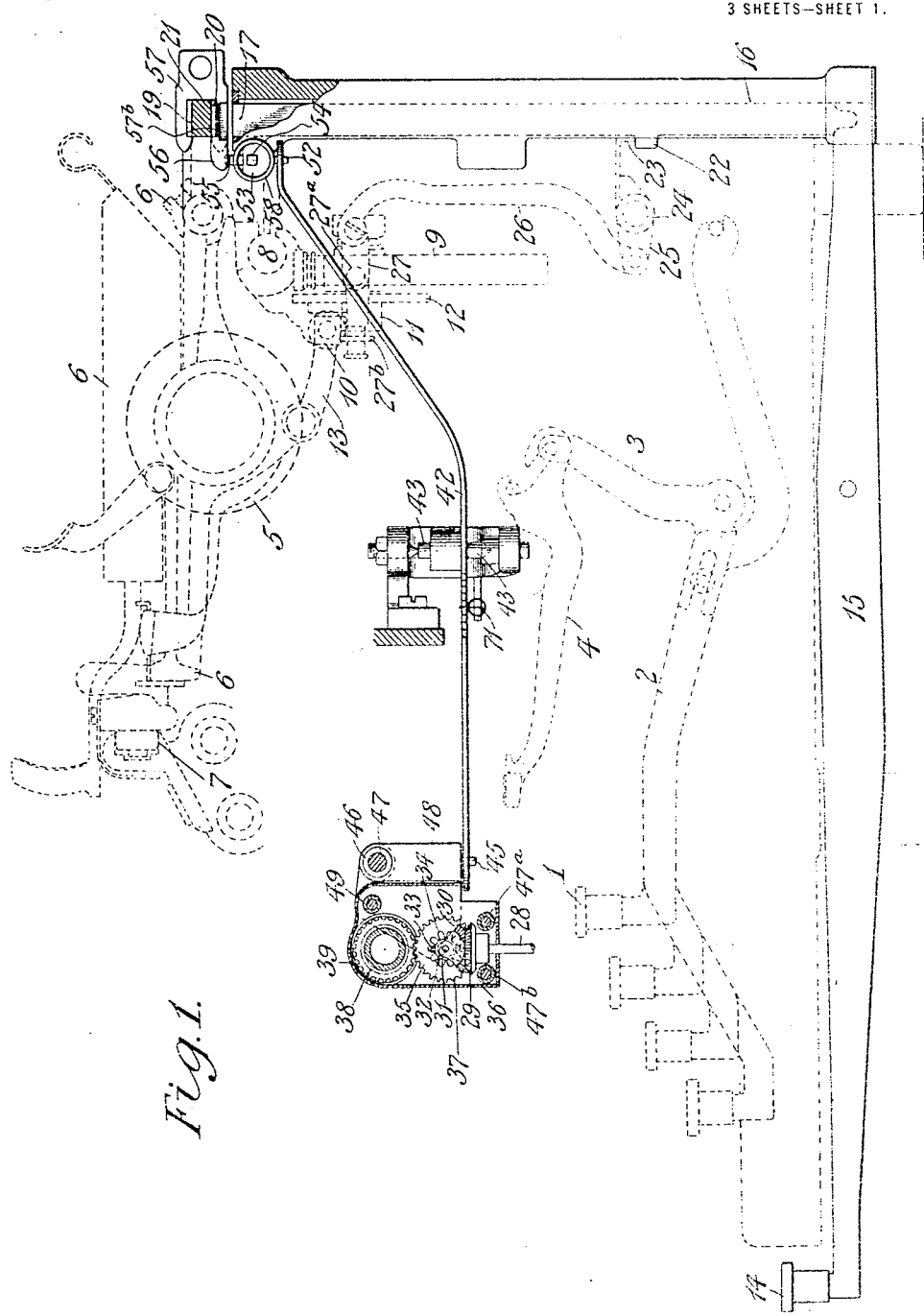

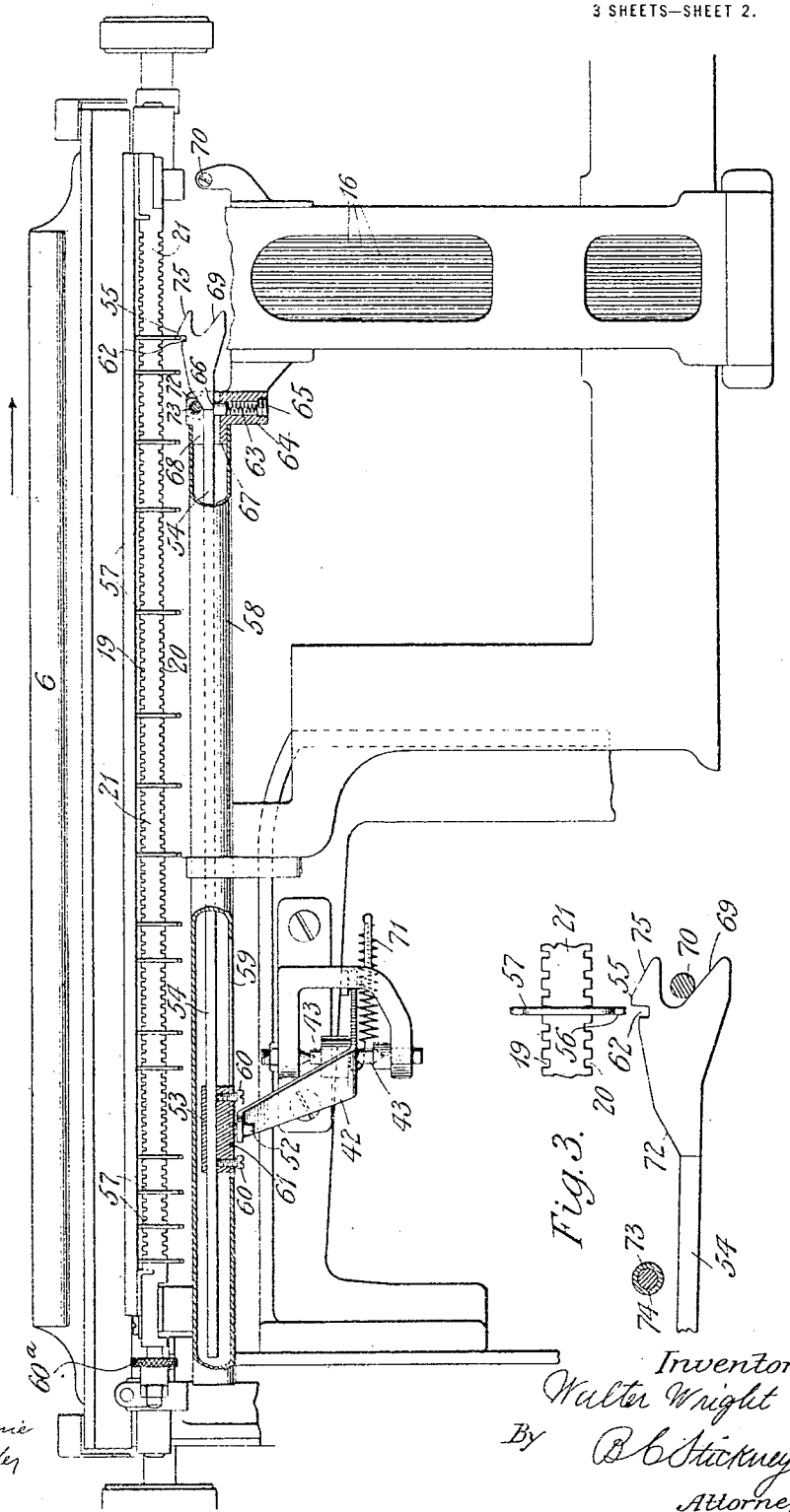

UNITED STATES PATENT OFFICE.

WALTER WRIGHT, OF NEW YORK, N. Y., ASSIGNOR TO UNDERWOOD COMPUTING MACHINE CO., OF NEW YORK, N. Y., A CORPORATION OF NEW YORK.

COMBINED TYPE-WRITING AND COMPUTING MACHINE.

1,244,398.  Specification of Letters Patent.  Patented Oct. 23, 1917.

Application filed August 1, 1910. Serial No. 574,813.

*To all whom it may concern:*

Be it known that I, WALTER WRIGHT, a citizen of the United States, residing in New York, in the county of New York and State of New York, have invented certain new and useful Improvements in Combined Type-Writing and Computing Machines, of which the following is a specification.

This invention relates to the mechanism which produces the step-by-step denominational movement between the master-wheel and the computing wheels of a combined typewriting and computing machine, and more particularly to means for automatically connecting and disconnecting the traveling member of the computing mechanism (whether it be the master-wheel or the gang of computing wheels), with the main carriage of the typewriter, as is necessary for the operation of cross-adding and for other purposes.

In the preferred form of the invention, the master-wheel is the traveling member of the computing mechanism, and it is connected by a lever to a latch or hook; a connection of this general kind being disclosed in certain of my pending United States applications. The hook is employed to connect the paper carriage of the typewriter to the traveling master-wheel, and to automatically effect disconnection therefrom and reconnection thereto.

One of the principal features of the present improvements is to simplify the construction and operation of the machine; and to this end I employ the usual column-stop rack of a tabulating typewriter in connection with the traveling member of the computing device; and it will be understood that, so far as this feature of the invention is concerned, it is immaterial whether the movable member of the computing device consists of the master-wheel or of the gang of computing wheels.

In said column stop rack I insert blades or members in position to be engaged by said hook; and these members may be substantially in the form of ordinary column stops, and may, if desired, perform the usual function of the column stop, in addition to the function of serving to connect the paper carriage with the traveling member of the computing mechanism; so that the operator, when setting the column stop to position for writing figures in the proper column on the page, may, by the same act, position the column stop for connecting the computing mechanism to the carriage to add the numbers written in such column. As set forth in my pending United States applications, the master-wheel and the gang of adding wheels are constantly operative, so that when a numeral key of the typewriter is depressed, at any part of the line of writing, said master-wheel will turn, and a corresponding number will be added on the corresponding wheel of the computing mechanism; the only function of the hook and of said blade or member being to connect the paper carriage to the traveling member of the computing mechanism, for a step-by-step denominational movement thereof. Other features and advantages will hereinafter appear.

In the accompanying drawings,

Figure 1 is a sectional elevation from front to rear, showing the present improvements applied to an Underwood front strike combined typewriting and computing machine.

Fig. 2 is a rear elevation of the machine.

Fig. 3 illustrates the manner of automatically disconnecting the traveling member of the computing mechanism from the typewriter carriage.

Fig. 4 is a sectional plan of that portion of the computing mechanism which is involved in the present invention.

Fig. 5 is a perspective view of one of the hooks and its appurtenances.

Fig. 6 is a sectional view showing the hook in cross-section, and also the spring by which it is lifted to connect it with the typewriter carriage.

Figs. 7, 8 and 9 show different forms of stops or blades to be inserted in the tabulator rack for calculating and cross adding.

In the Underwood machine, numeral keys 1 depress levers 2 to vibrate bell cranks 3, and swing type bars 4 up to strike rearwardly against the front side of a platen 5. Said platen is mounted on a carriage 6, running on tracks 7, 8, and is driven by a spring barrel 9, and also has a rack 10 meshing with a pinion 11 connected to an escapement wheel 12, the escapement dogs, which are operated at every key stroke, being omitted. The rack 10 is hung on arms 13, so that it may be lifted from the pinion 11 to release the carriage.

Tabulator keys 14 are mounted upon levers 15, which, at their rear ends, raise the stop rods 16, having decimal stops 17 at their upper ends. These stops may coöperate with interchangeably adjustable column stops 18, Fig. 8, of the ordinary type; said column stops being inserted, as required, in notches 19, 20, formed in the top and bottom of a bar 21, which is fixed to the carriage 6.

Each decimal stop-rod has a shoulder 22 coöperating with a universal bar 23, which rocks about a pivot 24, and has an arm 25, which draws down a link 26 and vibrates a lever 27, the latter fulcrumed at $27^a$ and carrying a roll $27^b$ to run upon the under side of the rack bar 10, and lift the latter from the escapement pinion 11, whenever a key 14 is depressed. As so far described in detail, the parts are in common use on said Underwood typewriting machine.

The computing mechanism includes a drive shaft 28, having a bevel pinion 29 meshing with a pinion 30 upon a square shaft 31, the latter being splined to a master-wheel 32, which moves along the shaft and has spurs or teeth 33 to engage an internal set of teeth 34 formed upon a gang of computing wheels 35, the latter mounted in a casing 36 and also having exterior teeth 37 to mesh with gears 38, the latter having number wheels 39. The master-wheel 32 is swiveled in a traveling hollow mandrel or arbor 40, within which the master-wheel shaft 31 may project, the swivel-joint being shown at 41, and permitting the master-wheel 32 to be rotated by the shaft 31, while said master-wheel is caused to travel in axial direction by the mandrel or arbor 40.

The mechanism so far described in detail forms no part of the present invention, and the drive shaft 28 may be driven and controlled either directly by the numeral keys 1 or in any other suitable manner, as for instance in the manner set forth in my pending application No. 569,502, filed June 29, 1910. Since the driving means for said shaft form no part of the present invention, it is deemed unnecessary to illustrate the same. The shaft, it will be understood, is rotated automatically upon the depression of any of the numeral keys 1, the extent of rotation depending upon which key is depressed.

The mandrel 40 is moved endwise by means of a forwardly and rearwardly extending lever 42, pivoted midway of its ends by means of gudgeons 43, so as to swing in a horizontal plane. At its forward end the lever is slotted at 44 to engage a pin 45 projecting from the carriage which carries the mandrel 40; said carriage comprising a tube 46 sliding upon a fixed rod 47, and also an arm 48, sliding upon a fixed horizontal rod 49; the mandrel 40 being secured to the forward end of the arm 48 by means of a set-screw 50. The movement of the mandrel 40 is of course only sufficient to enable the master-wheel 32 to travel the length of the gang of computing wheels 35, one of which is provided for each number wheel 39. The rod 47 coöperates with two similar rods or studs $47^a$ and $47^b$, all projecting from a framework plate or bracket $47^c$, to carry a small plate $47^d$, which also supports the end of rod 49. It will be seen that $47^a$ and $47^b$, Fig. 1, carry the casing 36.

At its rear end, the lever 42 has a slot 51 to engage a pin 52 projecting down from a slide 53, the latter carrying the stem 54 of a hook 55, adapted to engage lugs 56 formed upon said stops 18 or upon blades 57 which are forked to fit into the double rack 19, 20, for connecting the paper carriage 6 to the master-wheel 32 to cause the latter to travel step-by-step with the paper carriage.

The slide 53 works in a tubular guide or housing 58, which is slotted on its under side at 59 to permit the pin 52 to pass down to the lever 42. The stem 54 of the hook 55 passes through a longitudinal perforation in the slide 53, and is adjustably secured to the latter by set screws 60, Fig. 2. This permits slight longitudinal adjustment of the hook in order to enable the master-wheel 32 to be adjusted properly relatively to the computing wheels 35 while the hook is engaged by one of the lugs 56. The rack 21 has at $60^a$ the usual provision for longitudinal adjustment. The slide 53 has a feather 61, to fit into the slot 59, to prevent the slide and the hook from turning in the tube.

The hook has a notch 62 to enable it to engage any of the lugs 56. The hook normally springs up to engage the adjacent lug. For this purpose the hook may be made resilient or flexible, and a compression spring 63 may be employed to aid or cause the upward movement of the hook; said spring housed in a boss 64, and confined by a screw 65, and pressing a plunger 66 up against a straight portion of the under side of the hook, thus holding the latter up while permitting it to move freely endwise. The boss 64 is formed on a bushing 67, which is vertically slotted at 68 to form a guide for the hook; said bushing serving as a plug to close this end of the tubular housing 58.

When the hook is in engagement with one of said lugs 56, it is carried with the paper carriage 6 in the direction of the arrow at Fig. 2, that is, to the right, to cause the lever 42 to swing upon its pivot and thereby drive the mandrel 40 and the master-wheel 32 to the left at Fig. 4. As the keys 1 are operated to write figures in the column, the master-wheel 32 is correspondingly rotated in any usual or suitable manner, to rotate the corresponding computing wheels 35. When the master-wheel has advanced past the computing wheel 35 of lowest denomination, a cam 69 formed on the hook 55 engages a projection 70 fixed upon the framework of the machine, and is thereby forced downwardly, to withdraw the hook 55 from that lug 56 with which it has been in engagement. As soon as the hook is released, a returning spring 71 connected to the lever 42 swings the latter in the opposite direction, carrying the master-wheel 32 backwardly or to the right at Fig. 4, that is, toward the computing wheel 35 of highest denomination; this movement continuing until the hook 55 engages the succeeding lug 56, said hook being pressed up to engage said lug by means of the spring 63, and the hook becoming fully seated in the notch 62, as at Fig. 5. The writing of the numbers in the succeeding column will now proceed, and said number will be accumulated on said computing wheels by the number wheels 39, in the manner already referred to.

When returning the carriage 6 to begin a new line of writing, if the hook 55 is in engagement with one of the lugs 56, it is carried to the left at Fig. 2, until a cam edge 72 thereon strikes a stud or roller 73, which may be pivoted upon a screw 74, threaded into the top of the boss 64; and by means of said roller or obstruction, the hook is cammed downwardly and released from the lug 56. The spring 63 immediately lifts the hook again, and the lugs 56 in succession ride freely over a bevel or point 75 formed on the tip of the hook; the last lug in the series being caught and held by the hook when the carriage begins to run in letter-feeding direction.

At Fig. 8, the lug 56 is shown in the form of a continuation or extension of the lower of the two prongs seen at Fig. 9, and hence this blade 57 may be used for both tabulating purposes, in connection with the keys 14, and for connecting the master-wheel 32 to the paper carriage 6, at the proper point in the travel of the latter to enable the number written in the selected column to be added upon the corresponding computing wheels 35.

At Fig. 9 is illustrated the usual Underwood column-stop, without the extension 56. This stop may, of course, be placed in the rack 21 in the usual manner, and without the capability of engagement by the hook 55; as it may be sometimes desired to write a column of names or other items when it is not desired to compute.

At Fig. 7 is shown a blade 57$^a$, having a notch 57$^b$ opposite the decimal stops 17; and it will be seen that these blades may be set at such points along the rack 21 as desired to connect the master-wheel 32 to the paper carriage 6, regardless of the operation of the tabulating mechanism. It will be understood that all three kinds of blades 18, 57, and 57$^a$, may be employed at the same time on the rack 21; or only two kinds of blades, as 57$^a$ and 18, may be used in some cases. The endwise adjustment of stem 54 enables the hook to be readily adjusted for either Fig. 8 or Fig. 7 form of blade, the Fig. 9 stop being, of course, set the proper distance from 57, say one or two letter-spaces.

It will thus be seen that the master wheel 32 may be connected up to the paper carriage 6 by a very simple mechanism, without the necessity of providing an additional rack to carry the lugs that engage with the hook 55; the lever 42 conveniently connecting the master-wheel, which is at the front of the machine, with the hook 55 which engages the lugs 56 on the rack 21, which, in the Underwood typewriter, is placed at the rear of the machine.

This invention is an improvement upon the structures disclosed in various of my pending applications which are involved directly or indirectly in interferences, viz., No. 388,766, filed August 16, 1907; No. 428,020, filed April 20, 1908; No. 485,046, filed March 22, 1909; and No. 569,502, filed June 29, 1910; but none of said applications discloses features which are made the subject-matter of the claims in this application, which subject-matter relates to the typewriter tabulator column-stops and key-controlled stop to coöperate therewith, the lugs on the column-stops that engage the hook, the tubular housing for the hook, and the master-wheel connection from the hook placed at the back of the machine, to engage the column-stop lugs, by means of a forwardly-extending lever that is pivoted between its ends. The use of a lever for the hook is disclosed in several of said applications, but not in the particular combinations claimed herein.

Variations may be resorted to within the scope of the invention, and portions of the improvements may be used without others.

Having thus described my invention, I claim:

1. The combination of a typewriter carriage, a rack upon said carriage, column stops adjustable along said rack, a key-operated stop upon the machine frame to coöperate with said column stops, a latch or hook, means to cause the hook to engage certain of said stops, means dependent on the movement of the carriage for causing said hook to release the stops, a master wheel, a gang of computing wheels, and means connected to said hook to effect relative traveling movement between said master wheel and said computing wheels.

2. The combination with a typewriter carriage, of a rack upon said carriage forming part of a typewriter-tabulating mechanism, lugs adjustably mounted upon said rack, a latch or hook to engage said lugs, a lever pivoted between its ends and connected at one end to said hook, a master-wheel connected to the other end of said lever and forming part of a computing mechanism, and means for causing said hook to engage and release the lugs in succession.

3. A typewriting and computing mechanism comprising a typewriter carriage, a rack upon said carriage, members adjustable interchangeably upon said rack, certain of said members having column stops, and others of said members having lugs but unprovided with column stops, a key-operated stop upon the machine frame to coöperate with said column stops, a latch or hook, means to cause the hook to engage said lugs, means dependent upon the travel of the carriage for causing the hook to release the lugs, a master-wheel, a gang of computing wheels, and means connected to the hook to effect relative traveling movement between the master-wheel and the computing wheels.

4. A typewriting and computing mechanism comprising a typewriter carriage, a rack upon said carriage, members adjustable interchangeably upon said rack, certain of said members having column stops, and others of said members having lugs but unprovided with column stops, and still others of said members provided with both column-stops and lugs, a key-operated stop upon the machine frame to coöperate with said column stops, means dependent upon the travel of the carriage for causing the hook to release the lugs, a master-wheel, a gang of computing wheels, and means connected to the hook to effect relative traveling movement between the master wheel and the computing wheels.

5. The combination with a typewriter carriage, of a rack upon said carriage, members adjustable upon said rack, certain of said members having column stops, and certain of said members having lugs, a key-operated stop upon the machine frame to coöperate with said column stops, a latch or hook, means to cause the hook to engage said lugs, means dependent upon the travel of the carriage for causing the hook to release the lugs, a master-wheel, a gang of computing wheels, and means connected to the hook to effect relative traveling movement between the master-wheel and the computing wheels.

6. The combination with a typewriter carriage, of a rack upon said carriage, column stops adjustable along said rack, each of said column stops provided with a lug, a key-operated stop upon the machine frame to coöperate with said column stops, a latch or hook, means to cause the hook to engage said lugs, means dependent upon the travel of the carriage for causing the hook to release the lugs, a master-wheel, a gang of computing wheels, and means connected to the hook to effect relative traveling movement between the master-wheel and the computing wheels.

7. The combination with a typewriter carriage, of a rack upon said carriage, column stops adjustable along said rack, each of said column stops provided with a lug, a key-operated stop upon the machine frame to coöperate with said column stops, a latch or hook, means to cause the hook to engage said lugs, means dependent upon the travel of the carriage for causing the hook to release the lugs, a master-wheel, a gang of computing wheels, and means connected to the hook to effect relative traveling movement between the master-wheel and the computing wheels, said rack having teeth on opposite sides, and each of said column stops being forked to bestride the rack and one prong of the fork being prolonged to form said lug.

8. A typewriting and computing mechanism comprising a typewriter carriage, a key-operated stop, a rack upon said carriage, said rack having teeth on its opposite sides, forked members interchangeably adjustable along said rack, certain of said forked members having column stops to coöperate with said key-operated stop, and others of said forked members having lugs and being formed to escape or clear said key-operated stop, a latch or hook, means to cause the hook to engage said lugs, means dependent upon the travel of the carriage for causing the hook to release the lugs, a master-wheel, a gang of computing wheels, and means connected to the hook to effect relative traveling movement between the master-wheel and the computing wheels.

9. A combined typewriting and computing machine comprising a paper carriage having a rack on its rear portion, interchangeable members adjustable along said rack, certain of said members having column stops and certain of said members having lugs, a key-operated stop upon the framework of the machine to coöperate with said column stops, a latch or hook, a lever extending from front to back of the machine and pivoted between its ends and connected at its rear end to said hook, a master-wheel to which the forward end of said lever is connected, said master-wheel mounted at the front of the machine, a gang of computing wheels engageable by said master-wheel, means tending to cause said hook to engage said lugs, means dependent upon the movement of said carriage to release said hook from said lugs, and means to swing said lever when said hook is released, to return said master-wheel to begin a new computation.

10. A combined typewriting and computing machine comprising a paper carriage having a rack, interchangeable members adjustable along said rack, certain of said members having column stops and certain of said members having lugs, a key-operated stop upon the framework of the machine to coöperate with said column stops, a latch or hook, a lever pivoted between its ends and connected to said hook, a master-wheel to which said lever is connected, a gang of computing wheels engageable by said master-wheel, means tending to cause said hook to engage said lugs, means dependent upon the movement of said carriage to release said hook from said lugs, and means to swing said lever when said hook is released, to return said master-wheel to begin a new computation.

11. The combination with a typewriter carriage and a series of lugs carried thereby, of a fixed tubular housing, a slide fitting in said housing, a hook having a stem extending into said housing and connected at one end to said slide, means tending to engage said hook with said lugs, means dependent upon the movement of the carriage for releasing said hook, a master-wheel, a gang of computing wheels engageable by said master-wheel, means connected to said slide for effecting relative movement between said master-wheel and said computing wheels, and means to return said slide toward normal position when said hook is released from any of said lugs.

12. The combination with a typewriter carriage and a series of lugs carried thereby, of a fixed tubular housing, a slide fitting in said housing, a hook having a stem extending into said housing and connected at one end to said slide, means tending to engage said hook with said lugs, means dependent upon the movement of the carriage for releasing said hook, a master-wheel, a gang of computing wheels engageable by said master-wheel, a lever pivoted between its ends upon a framework and connected at one end to said slide, and means connected to the other end of said lever for effecting relative movement between said master-wheel and said computing wheels, and a returning spring for said lever.

13. The combination with a typewriter carriage and a series of lugs carried thereby, of a fixed tubular housing, a slide fitting in said housing, a hook having a stem extending into said housing and connected at one end to said slide, a plug closing the end of said tubular housing, said plug having a slotted guide for said hook, a boss upon said plug, a spring confined in said boss to raise said hook, means dependent upon the movement of the carriage for releasing said hook, a master-wheel, a gang of computing wheels engageable by said master-wheel, means connected to said slide for effecting relative movement between said master-wheel and said computing wheels, and means to return said slide toward normal position when said hook is released from any of said lugs.

14. The combination of a master wheel, a hook, a swinging lever operating at one end the master wheel, and at the other end the hook, column stops having lugs to be engaged by the hook, fixed stops or intercepters to release the hook from the lugs and a key-operated stop to coöperate with said column stops.

15. The combination with a typewriter carriage and a series of lugs carried thereby, of a fixed tubular housing, a slide fitting in said housing, a hook having a stem extending into said housing and connected at one end to said slide, means tending to engage said hook with said lugs, means dependent upon the movement of the carriage for releasing said hook, a master-wheel, a gang of computing wheels engageable by said master-wheel, means connected to said slide for effecting relative movement between said master-wheel and said computing wheels, and means to return said slide toward normal position when said hook is released from any of said lugs, means being provided for effecting endwise adjustment of said stem relatively to said slide.

16. The combination with a movable computing member, of a step-by-step feeding carriage, a projection thereon, a hook having a yielding stem and engageable with said projection, a tubular housing for affording protection for the stem of said hook, said hook having a nose projecting from one end of said housing, said housing having a slot in the bottom thereof, and an operating lever having a connection extending through said slot to said hook, and connected to said movable computing member to operate the same.

17. The combination with a movable computing member, of a step-by-step feeding carriage, a projection thereon, a hook having a yielding stem and engageable with said projection, a tubular housing for affording protection for the stem of said hook, said hook having a nose projecting from one end of said housing, said housing having a slot in the bottom thereof, an operating lever having a connection extending through said slot to said hook, and connected to said movable computing member to operate the same, and a yielding support for said hook located in one end of said housing.

WALTER WRIGHT.

Witnesses:
B. GOLDBERG,
C. RIPLEY.

Copies of this patent may be obtained for five cents each, by addressing the "Commissioner of Patents, Washington, D. C."